H. S. HOLMES.
ELECTRIC WELDING MACHINE.
APPLICATION FILED AUG. 17, 1918.

1,290,996.

Patented Jan. 14, 1919.
2 SHEETS—SHEET 1.

Inventor
Henry S. Holmes
By his Attorney
Park Benjamin

H. S. HOLMES.
ELECTRIC WELDING MACHINE.
APPLICATION FILED AUG. 17, 1918.

1,290,996.

Patented Jan. 14, 1919.
2 SHEETS—SHEET 2.

Inventor
Henry S. Holmes
By his Attorney
Carl Benjamin

UNITED STATES PATENT OFFICE.

HENRY S. HOLMES, OF BROOKLYN, NEW YORK, ASSIGNOR TO THOMAS E. MURRAY, OF NEW YORK, N. Y.

ELECTRIC WELDING-MACHINE.

1,290,996.  Specification of Letters Patent.  Patented Jan. 14, 1919.

Application filed August 17, 1918. Serial No. 250,283.

*To all whom it may concern:*

Be it known that I, HENRY S. HOLMES, a citizen of the United States, residing at Brooklyn, in the county of Kings and State of New York, have invented a certain new and useful Improvement in Electric Welding-Machines, of which the following is a specification.

In U. S. patent to Thomas E. Murray, No. 1,267,256, dated May 21, 1918, there is set forth a hollow elongated projectile having guide vanes attached to one end. The said vanes are formed of four elongated metal plates, each bent longitudinally at right angles. Prior to their attachment to the projectile, these plates are assembled with their angles in juxtaposition and their contiguous surfaces are electrically welded together, so that they unitedly form four vanes ninety degrees apart. At one end of the vanes is formed a concavo-convexity which fits upon the rounded end of the projectile and is electrically welded thereto.

My present invention relates to the electrical welding together of the aforesaid longitudinaly bent vane plates, and consists in the construction of the welding apparatus, hereinafter set forth, whereby said plates instead of being united over the whole area of their contiguous surfaces are united only over narrow portions of said area immediately adjacent to the longitudinal edges of said plates. I find that this joint is of ample strength, requires less welding current and is more uniformly made.

In the accompanying drawings—

Figure 1:
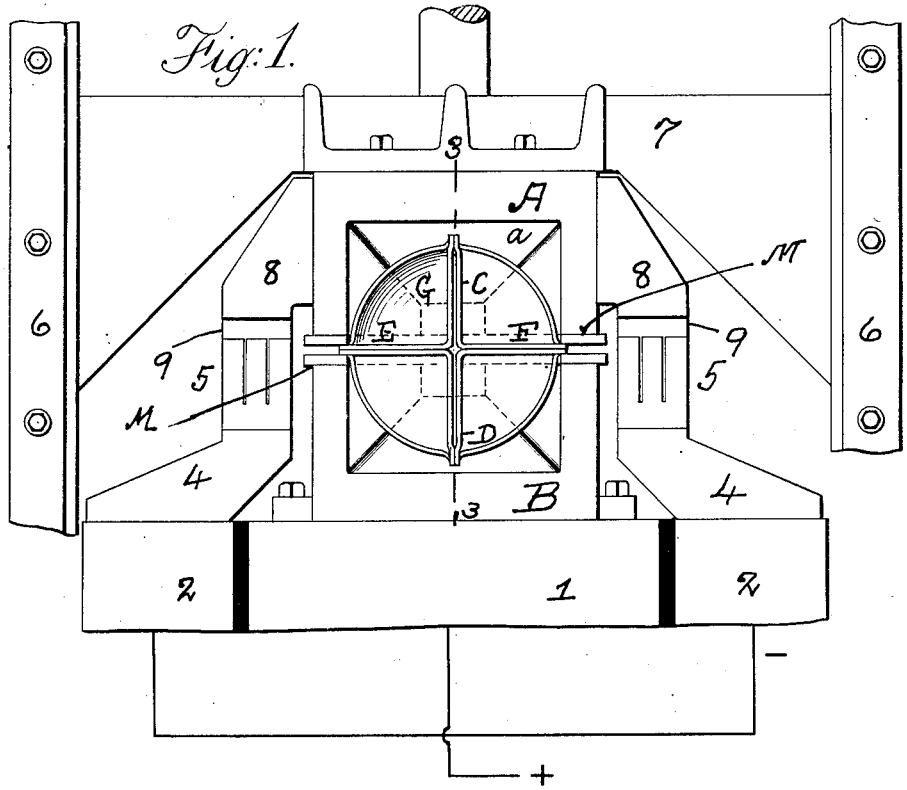
Figure 2:
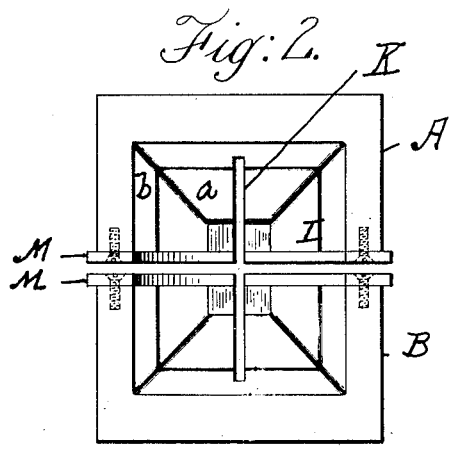
Figure 3:
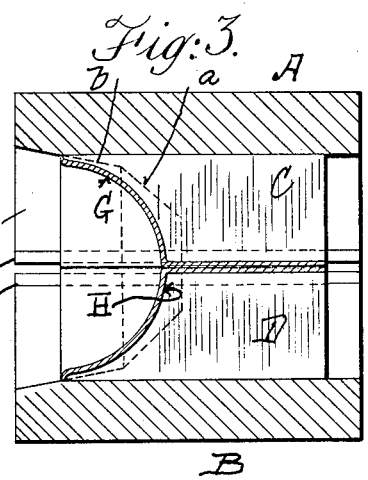
Figure 4:
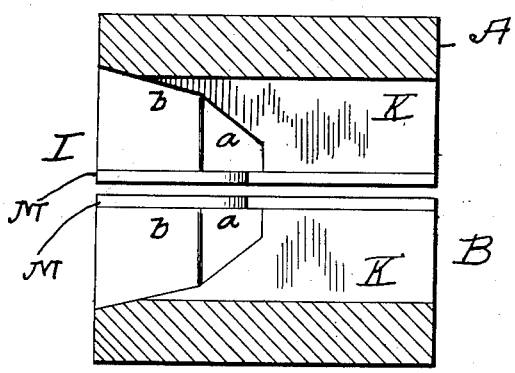
Figure 5:
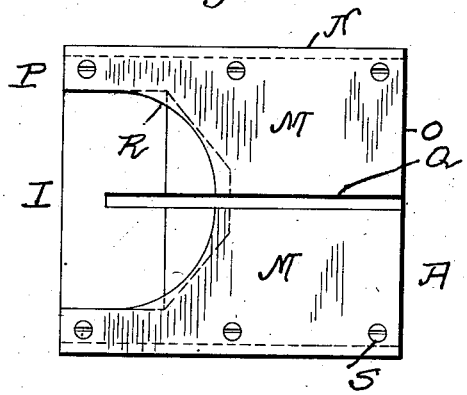
Figure 7:
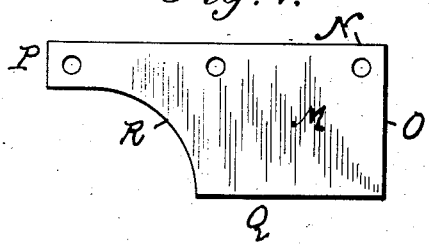
Figure 6:
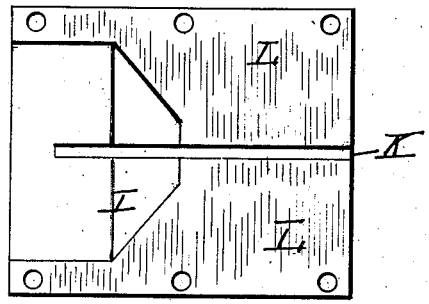

Figure 1 is a front elevation of my electric welding machine, showing in place the vanes to be welded and the upper electrode lowered into welding position. Fig. 2 is a front view of the welding electrodes, the upper electrode being raised. Fig. 3 is a longitudinal vertical section of the welding electrodes and vanes on the line 3, 3 of Fig. 1. Fig. 4 is a similar section of the welding electrodes only. Fig. 5 is a top view of the lower welding electrode, or a bottom view of the upper electrode, said electrodes being alike, showing the facing plates in position thereon. Fig. 6 is a similar view, with the facing plates removed. Fig. 7 is a plan view of one of the facing plates.

Similar numbers and letters of reference indicate like parts.

The metal bed comprises a middle section 1 and side sections 2, said middle section being insulated from the side sections. The side sections are connected in multiple to one terminal of the welding circuit, and the middle section is connected to the opposite terminal. On the side sections are standards 4 which carry vertical spring contacts 5. 6, 6 are fixed vertical ways, between which slides the vertically moving frame 7 which carries the upper electrode A. On the opposite sides of said electrode are brackets 8 having contacts 9 which coöperate with contacts 5 when said electrode is in lowered position. The lower electrode B is supported on the middle section 1 of the bed.

The vanes are formed of four elongated metal plates, each of which is bent longitudinally at right angles. The apexes of the angles are approximated, as shown in Fig. 1, and the welded joints are made between the contiguous plates. Four vanes, C, D, E, F, ninety degrees apart, result. At one end the assembled vanes are cut away, and at the cut away portions are provided concave walls G, which when the vanes are united together form a substantially hemispherical recess, the concavity of which fits upon and is united to the rounded end of the projectile, as fully set forth in the Murray patent aforesaid, and the convexity, as shown at H, being between the vanes.

The electrodes A and B are alike, so that a description of one applies to both.

The electrode A, as shown in Figs. 2 and 4, has at one end an inwardly tapering recess I, which preferably is twice tapered, as shown at $a$ and $b$. Bi-secting recess I is a longitudinal channel K, which also extends through the electrode. It will be obvious that when the electrodes A, B are placed one above the other, as shown in Fig. 1, the vanes C, D enter the channels K, and the vanes E, F enter the intervals between the electrodes outside of the recess I and project into said intervals for a short distance. The convexity H between the ends of the vanes formed by the walls G then becomes seated in the tapered recess I. It may here be noted that the object of giving said recess two tapers is to permit said convexity to be more closely seated therein.

The faces L, Fig. 6, of each electrode are preferably covered by plates M, shaped as shown in Fig. 7. The outer edge N and end edge O of said plate register with the corresponding edges of the electrode. A portion P of the other end edge registers with the front edge of the electrode. A portion Q of the inner edge of said plate meets the channel K.

Between the portions P and Q the plate has a curved edge R to correspond to the convexity H of the vane walls G, so that when the vanes are in welding position, Fig. 3, the plates M will fit against said convexity. The plates M are detachably secured upon the electrode faces by bolts S, so that they can be removed and new plates substituted in order to compensate for wear or injury.

The vanes are inserted separately into the separated electrodes, and take the position already described and shown in Fig. 1. That is to say, the vanes E, F, here horizontal for a short distance inward from their outer edges, lie between the plates M on the electrodes A, B. The convexity H formed by walls G lies in the recess I. The vanes C, D, here vertical, lie in the channels K. The electrode A is depressed until its contacts 9 engage with contacts 5. Then circuit is established through the narrow areas adjacent to the outer edges of vanes E, F, forming the welded joint thereat. Electrode A is then raised, and the vanes being removed from the machine are rotated ninety degrees on their longitudinal axis and replaced, so that the now welded vanes E, F enter the channels K, and the unwelded vanes C, D enter between the plates M. Electrode A is again lowered, and the vanes C, D electrically united in the manner already described. This completes the work, which is now ready for attachment to the end of the projectile, as set forth in the Murray patent aforesaid.

In Fig. 1, I have shown the vanes E, F with their constituent plates in face contact everywhere, although the welding is effected only near the outer edges. If desired, the surfaces of said plates within the welded area may be slightly separated, as shown in the vanes C, D in Fig. 1, in order more closely to define said welded area.

I claim:

1. An electric welding machine for uniting the edge portions of projectile vanes of the type set forth, comprising two electrodes having corresponding recesses at one end for receiving the concavo-convex portion of said vanes, opposing faces adapted to receive the edge portions of two of said vanes, as E, F, between them, and channels at right angles to said faces adapted to receive the remaining vanes, as C, D.

2. An electric welding machine, as in claim 1, further including the detachable wearing-plates M on the opposing faces of said electrodes.

In testimony whereof I have affixed my signature in presence of two witnesses.

HENRY S. HOLMES.

Witnesses:
GERTRUDE T. PORTER,
MAY T. MCGARRY.